United States Patent [19]

Teraue et al.

[11] Patent Number: 5,726,210
[45] Date of Patent: Mar. 10, 1998

[54] PROCESS FOR PREPARATION OF ANION EXCHANGE RESIN

[75] Inventors: Takeshi Teraue; Youichi Tamura, both of Fukuoka, Japan

[73] Assignee: Mitsubishi Chemical Corporation, Tokyo, Japan

[21] Appl. No.: 741,913

[22] Filed: Oct. 31, 1996

[30] Foreign Application Priority Data

Nov. 28, 1995 [JP] Japan .................................. 7-309219

[51] Int. Cl.⁶ .............................. C08F 8/32; B01J 39/08; B01J 39/20
[52] U.S. Cl. .................. 521/32; 521/25; 521/30; 525/333.4; 525/333.6; 525/336; 525/374; 525/379
[58] Field of Search .................. 521/32, 25, 30; 525/333.4, 333.6, 374, 379

[56] References Cited

U.S. PATENT DOCUMENTS

| | | | |
|---|---|---|---|
| 2,631,999 | 3/1953 | McMaster | 521/32 |
| 4,322,501 | 3/1982 | Lee | 521/32 |
| 4,785,020 | 11/1988 | Boom | 571/32 |

OTHER PUBLICATIONS

Helfferich, "Ion Exchange" (1962) 53–55, McGraw–Hill (New York).

*Primary Examiner*—Fred Zitomer
*Attorney, Agent, or Firm*—Oblon, Spivak, McClelland, Maier, & Nuestadt, P.C.

[57] ABSTRACT

A process for the preparation of an anion exchange resin is described, which comprises reacting an aromatic crosslinked haloalkyl-containing copolymer with an amine in the presence of at least 100 parts by weight, per 100 parts by weight of the copolymer, of water and at least 5 parts by weight, per 100 parts by weight of water, of a water-soluble inorganic salt. A process for the preparation of an anion exchange resin is also described, which comprises acting a haloalkylating agent on an aromatic crosslinked copolymer, separating an unreacted portion of the haloalkylating agent from the aromatic crosslinked haloalkyl-containing copolymer so obtained, and reacting the resulting haloalkyl-containing copolymer with an amine in the presence of at least 100 parts by weight, per 100 parts by weight of the copolymer, of water and at least 5 parts by weight, per 100 parts by weight of water, of a water-soluble inorganic salt.

12 Claims, No Drawings

PROCESS FOR PREPARATION OF ANION EXCHANGE RESIN

FIELD OF THE INVENTION

This invention relates to a process for the preparation of an anion exchange resin, particularly to a process for the preparation of an anion exchange resin having high physical strength.

BACKGROUND OF THE INVENTION

As anion exchange resins, those of various structures have been known. Of these, most widely used is an anion exchange resin which has an aromatic crosslinked copolymer as a skeleton and a secondary to tertiary amino group or a quaternary ammonium group as an ion exchange group. The anion exchange resin is generally prepared by causing a chloromethylating agent to act on a styrene-divinyl benzene crosslinked copolymer in the spherical form, which has been obtained by suspension polymerization of styrene and divinylbenzene, to obtain a chloromethylated crosslinked copolymer, and then causing an aminating agent such as methylamine or trimethylamine to act on the resulting copolymer.

One of the important indices upon evaluation of the performance of an ion exchange resin is whether the physical strength of the resin is high or not. When the resin has low physical strength, it is fractured during the use, thereby causing an increase in the pressure loss upon delivery of the liquid to be treated to an ion exchange resin column. Furthermore, the fractured resin flows out together with the rinsing water upon back wash, which causes a loss of the resin.

Various factors have influences on the physical strength of an anion exchange resin and one of them is the reaction condition at the time of the amination reaction. It is known that an anion exchange resin having high physical strength is available by reacting a haloalkylated crosslinked copolymer with an amine using, for example, tetrahydrofuran, dioxane or the like as a reaction medium. The above process cannot be employed as an industrial preparation process because of the difficulty in the recovery of the reaction medium.

In JP-B-41-21036 (the term "JP-B" as used herein means an "examined published Japanese patent application"), described is a process in which an anion exchange resin having high physical strength can be obtained by haloalkylating a crosslinked copolymer, neutralizing the remaining portion of the haloalkylating agent with an alkali, thereby forming its corresponding salt and then conducting amination reaction in the presence of the resulting salt. In the above publication, it is also described that similar effects cannot be obtained even if a salt is added externally at the amination time and that it is preferred to conduct amination reaction under the condition that water is present as small as possible. This process is however accompanied with the disadvantage that the haloalkylation reaction is generally conducted using an excess haloalkylating agent so that the unreacted portion of the haloalkylating agent cannot be recovered in this process. Furthermore, the above process is irksome because it requires stepwise hydration after the amination reaction is conducted in the absence of water.

SUMMARY OF THE INVENTION

An object of the present invention is therefore to provide a process for the preparation of an anion exchange resin, which makes it possible to prepare a product having high strength even if an excess haloalkylating agent used in the haloalkylation process has been recovered.

Another object of the present invention is to provide a process for the preparation of an anion exchange resin which does not require an irksome hydration operation after the amination.

According to the present invention, an anion exchange resin having high physical strength can be obtained by reacting an aromatic crosslinked haloalkyl-containing copolymer with an amine in the presence of at least 100 parts by weight, per 100 parts by weight of the copolymer, of water and at least 5 parts by weight, per 100 parts by weight of water, of a water-soluble inorganic salt.

DETAILED DESCRIPTION OF THE INVENTION

Described specifically, the aromatic crosslinked haloalkyl-containing copolymer to be provided for the reaction with an amine in the present invention can be obtained by copolymerizing an aromatic monofunctional polymerizable monomer with a polyfunctional polymerizable crosslinking agent in the presence of a radical polymerization catalyst in a manner known per se in the art, and then reacting the resulting crosslinked copolymer with a haloalkylating agent in the presence of a Friedel-Crafts catalyst. Alternatively, the above aromatic crosslinked copolymer can be obtained by copolymerizing an aromatic, monofunctional, polymerizable and haloalkyl-containing monomer with a polyfunctional polymerizable crosslinking agent in the presence of a radical polymerization catalyst.

In the former process in which a haloalkyl group is introduced after the preparation of a crosslinked copolymer, examples of the aromatic monofunctional polymerizable monomer usable include aromatic monovinyl compounds, for example, styrene, alkyl-substituted styrenes such as methylstyrene and ethylstyrene and halogen-substituted styrenes such as bromo-styrene. Usable examples of the polyfunctional polymerizable crosslinking agent include divinylbenzene, trivinylbenzene, divinyltoluene, divinylnaphthalene, divinylxylene, ethylene glycol dimethacrylate, diethylene glycol dimethacrylate and trimethylol propane trimethacrylate.

It is preferred to use styrene as the aromatic polymerizable monofunctional monomer and divinylbenzene as the polyfunctional polymerizable crosslinking agent unless any particular reason is indicated.

The polyfunctional polymerizable crosslinking agent is generally used in an amount of 1 to 80 wt % based on the whole monomer weight. It is however preferred to use the crosslinking agent in an amount of 1 to 25 wt % in order to prepare an anion exchange resin having a large exchange capacity. Particularly, amounts of 1.5 to 10 wt % make it possible to prepare an anion exchange resin having both high strength and large exchange capacity. Examples of the radical polymerization catalyst include benzoyl peroxide, lauroyl peroxide, t-butyl hydroperoxide and azobisisobutylonitrile. The radical polymerization catalyst is used in an amount of about 0.1 to 5 wt % based on the whole monomer. Polymerization can be conducted in various manners such as emulsion polymerization and suspension polymerization, but it is generally preferred to employ the suspension polymerization method capable of providing a polymer in the form of beads. When the suspension polymerization is employed, the polymerization operation is conducted in a manner known per se in the art using an ordinarily-used solvent, dispersion stabilizer and the like. Upon suspension polymerization, an inert organic solvent or inert organic substance may be added to the reaction system in order to impart the resulting polymer with porosity. Examples of such an inert organic solvent or inert organic substance include isooctane, toluene, dichloroethane, dichlorpropane, isoparaffin and polystyrene.

Examples of the Friedel-Crafts catalyst used upon reaction of the so-obtained crosslinked copolymer with a haloalkylating agent include Lewis acid catalysts such as zinc chloride, iron(III) chloride, tin(IV) chloride and aluminum chloride. As the haloalkylating agent, it is preferred to use that having high affinity with the copolymer because it acts not only as a reaction reagent but also as a swelling solvent for the crosslinked copolymer. Specific examples include halides such as chloromethyl methyl ether, methylene chloride, bis(chloromethyl) ether and bis(chloromethyl) benzene. Of these, chloromethyl methyl ether is most preferred.

In general, an excess haloalkylating agent is used upon haloalkylation. The surplus haloalkylating agent existing after the completion of the haloalkylation reaction can be recovered by the method disclosed in JP-B-62-61204 in which recovery is effected by heating after the addition of hydrochloric acid; or by the method disclosed in JP-A-7-188333 (the term "JP-A" as used herein means an "unexamined published Japanese patent application") in which recovery is effected by solvent extraction.

When an aromatic monofunctional polymerizable haloalkyl-containing monomer and a polyfunctional polymerizable crosslinking agent are copolymerized, polymerization is conducted in a similar manner to the above method except that a haloalkylstyrene such as chloromethyl styrene or bromomethyl styrene is used as the aromatic monofunctional polymerizable monomer, whereby a desired haloalkyl-containing crosslinked copolymer can be obtained.

In the present invention, an anion exchange resin is prepared by reacting the aromatic crosslinked haloalkyl-containing copolymer so obtained with an amine in the presence of an aqueous solution of an inorganic salt. Any inorganic salt can be employed insofar as it is a water-soluble salt. Examples of the inorganic salt include water-soluble halides, carbonates and sulfates of an alkali metal such as sodium and potassium, and of an alkaline earth metal such as magnesium and calcium. Of these, it is advantageous to employ sodium chloride. When an inorganic salt other than sodium chloride is employed, it is preferred to use a neutral salt to avoid the loss of an amination reagent. It is necessary to conduct reaction in the presence of at least 5 parts by weight of the inorganic salt per 100 parts by weight of water. Amounts smaller than 5 parts by weight make it difficult to prepare an anion exchange resin having high physical strength. It is preferred to conduct the reaction in the presence of 7 to 30 g, particularly 7 to 25 g of the inorganic salt, per 100 g of water. Existence of the inorganic salt in an amount of at least 30 parts by weight per 100 parts by weight of water is generally wasteful. At the same time, when amination is conducted in an aqueous solution which contains the inorganic salt too much, particles having low crushing strength tend to be mixed in the product.

The amount of water necessary for the reaction is at least 100 parts by weight per 100 parts by weight of the aromatic crosslinked haloalkyl-containing copolymer. Water is a reaction medium and also a solvent for an amine which is an amination reagent. Furthermore, it is gradually absorbed by the crosslinked copolymer with the progress of amination and swells the same. When the amount of water is smaller than the above range, amination reaction does not proceed favorably and the anion exchange resin so obtained has lowered physical strength. The lowering in the physical strength is considered to occur partly because the resin drastically absorbs water and swells at the rinsing step after the completion of the amination reaction. It is desired that water exists in an amount of at least 150 parts by weight, particularly at least 200 parts by weight, per 100 parts by weight of the aromatic crosslinked haloalkyl-containing copolymer. There is no particular upper limit in the amount of water, however, an unnecessarily large amount of water is not desired because the larger amount of water inevitably increases the using amount of the inorganic salt. As will be described later, the amination reaction is generally effected in the coexistence of an organic solvent so that it is preferred to let the organic solvent take partial charge of a reaction medium and to control the amount of water to 500 parts by weight or smaller, particularly 400 parts by weight or smaller, per 100 parts by weight of the aromatic crosslinked haloalkyl-containing copolymer. Incidentally, the term "water" as used herein means all the water existing in the reaction system at the time when the aromatic crosslinked haloalkyl-containing copolymer is reacted with an amine.

As the amine used for the amination, those represented by the following formula (1):

are generally employed. In the formula (1), $R^1$, $R^2$, and $R^3$ each independently represents a hydrogen atom or a $C_{1-4}$ alkyl group which may contain a hydroxyl group, but they do not represent a hydrogen atom at the same time. Preferred examples of the amine include trimethylamine, triethylamine, dimethylamine, diethylamine and diethyl ethanolamine. The amine is used preferably in an amount of 0.5 to 1.2 mole per mole of the haloalkyl group. The amination reaction is generally conducted while the crosslinked copolymer is swelled with an organic solvent such as benzene, toluene, xylene or dichloroethane. The reaction temperature is generally 25° to 70° C. and it generally takes 1 to 10 hours for the reaction. After the completion of the reaction, the reaction product is rinsed with water in a manner known per se in the art, followed by the conversion of the salt type into a free type or a desired salt type, whereby an anion exchange resin can be obtained as a product. Incidentally, there is a description in the before-mentioned JP-B-41-21036 or the like that an aliphatic lower alcohol such as methanol is used as a reaction solvent for the amination reaction. According to the finding by the present inventors, however, the existence of the aliphatic lower alcohol tends to inhibit the reaction. It is therefore preferred to allow it to exist in an amount of 1 part by weight or smaller per 100 parts by weight of water, even if it exists. Accordingly, it is desired to sufficiently recover the unreacted portion of the haloalkylating agent after the haloalkylating step using chloromethyl methyl ether, because methanol is formed by the hydrolysis of chloromethyl methyl ether.

The present invention will hereinafter be described more specifically by the examples. It should however be borne in mind that the present invention is not limited by the following examples so long as it does not depart from the subject matter.

Incidentally, the halomethylated styrene-divinylbenzene crosslinked copolymer used in the following examples and comparative examples were prepared by the following process.

Preparation of a styrene-divinylbenzene crosslinked copolymer

Mixed were 460.5 g of styrene, 54.5 g (6 wt % as divinylbenzene based on the whole monomer) of divinylbenzene (purity: 56.7 wt %), 72.1 g of polystyrene and 1.31 g of benzoyl peroxide (purity: 75 wt %, wet product). The resulting mixture was suspended in 2,000 g of an aqueous solution containing 0.17 wt % of polyvinyl alcohol. The suspension was subjected to copolymerization by retaining it at 80° C. for 8 hours under stirring. From the copolymer so obtained, polystyrene was removed by extraction, whereby 516.4 g of a porous copolymer were obtained. Introduction of a haloalkyl group:

In a 1-l four-necked round bottom flask, 100 g of the dried copolymer, 216 g of chloromethyl methyl ether and 150 g of 1,2-dichloroethane were charged, followed by the addition of 55 g of zinc chloride. The resulting mixture was reacted at 55° C. for 10 hours. After the completion of the reaction, 291 g of 35% hydrochloric acid were added to the reaction mixture, followed by heating at 110° C. for 4 hours to distill and recover the unreacted portions of chloromethyl methyl ether and 1,2-dichloroethane. Until the cleaning liquid became neutral, rinsing was continued, followed by centrifugal filtration, whereby a chloromethylated crosslinked copolymer was obtained in an amount of 158 g (wet base).

The crushing strength of the anion exchange resin was measured as described below.

Measurement of crushing strength

An anion exchange resin (Cl type) was shifted through a sieve of 600 μm and the resin particles clogged in the sieve opening were collected. The pressure (g/particle) leading one particle of the resin to crushing was measured by Shachiron Crushing Strength Measuring Instrument manufactured by John Schachiron & Sons Co., Ltd. The measurement was conducted for 60 particles of the resin and the average value of the crushing strength was found.

EXAMPLE 1

In 1-l four-necked round bottom flask, 48 g of sodium chloride and 144 g of water were charged to dissolve the former in the latter. To the resulting solution, 62.8 g (wet base) of the above-obtained chloromethylated crosslinked copolymer having about 10% of a water content were added and suspended. Furthermore, 80 g of toluene were added to the resulting suspension, followed by stirring at 50° C. for one hour to cause swelling. To the reaction mixture, 87 me of a 30% aqueous solution of trimethylamine were added and they were reacted at 50° C. for 2 hours. After the completion of the reaction, the reaction mixture was filtered to recover the resin. The resin so obtained was rinsed, whereby 148 g (swelled base) of an anion exchange resin (Cl type) were obtained.

The properties of the anion exchange resin so obtained are shown in Table 1. Incidentally, the weight of water and sodium chloride in the reaction system is shown in Table 2.

EXAMPLES 2 TO 4

In a similar manner to Example 1 except that the amount of sodium chloride was changed to 12 g, 24 g and 88 g, respectively, amination reaction was conducted, whereby anion exchange resins were obtained. The properties of the resins so obtained are shown in Table 1. Incidentally, the weight of water and sodium chloride in the reaction system is shown in Table 2.

COMPARATIVE EXAMPLE

In a similar manner to Example 1 except that sodium chloride was not added, amination reaction was conducted, whereby an anion exchange resin was obtained. The properties of the resin so obtained are shown in Table 1. Incidentally, the weight of water and sodium chloride in the reaction system is shown in Table 2.

TABLE 1

|  | Ex. 1 | Ex. 2 | Ex. 3 | Ex. 4 | Comp. Ex. |
|---|---|---|---|---|---|
| Exchange capacity [meq/g-R] | 3.77 | 3.78 | 3.80 | 3.74 | 3.79 |
| Water content [wt %] | 49.5 | 49.2 | 49.8 | 49.5 | 49.8 |
| External appearance [%]* | 99 | 99 | 99 | 99 | 99 |
| Crushing strength [g/particle] | 180 | 106 | 177 | 175 | 86 |

*The anion exchange resin so formed was charged in a petri dish and after magnification to 20 times, the resin was visually observed. Existence of cracks was studied concerning about 400 resin particles existing in sight and the proportion of the crack-free resin particles are indicated by percentage.

TABLE 2

|  | Ex. 1 | Ex. 2 | Ex. 3 | Ex. 4 | Comp. Ex. |
|---|---|---|---|---|---|
| Sodium chloride [g] | 48 | 12 | 24 | 88 | 0 |
| Water [g] | 144 | 144 | 144 | 144 | 144 |
| 30% TMA aq.[1] [ml] | 87 | 87 | 87 | 87 | 87 |
| [g] | 80 | 80 | 80 | 80 | 80 |
| Water in 30% TMA aq. [g] | 56 | 56 | 56 | 56 | 56 |
| Water in total [g] | 200 | 200 | 200 | 200 | 200 |
| Sodium chloride per 100 g of water [g] | 24 | 6 | 12 | 44 | 0 |

[1]30% TMA aq.: a 30% aqueous solution of trimethylamine. Specific gravity: 0.92.

According to the process of the present invention, an anion exchange resin having high mechanical strength can be industrially prepared with ease.

While the invention has been described in detail and with reference to specific embodiments thereof, it will be apparent to one skilled in the art that various changes and modifications can be made therein without departing from the spirit and scope thereof.

What is claimed is:

1. A process for the preparation of anion exchange resin particles which comprises reacting aromatic crosslinked haloalkyl-containing copolymer particles with an amine in the presence of at least 100 parts by weight, per 100 parts by weight of the copolymer, of water and at least 5 parts by weight, per 100 parts by weight of water, of a water-soluble inorganic salt.

2. A process for the preparation of anion exchange resin particles which comprises acting a haloalkylating agent on aromatic crosslinked copolymer particles, separating an unreacted portion of the haloalkylating agent from the aromatic crosslinked haloalkyl-containing copolymer particles so obtained, and reacting the resulting haloalkyl-containing copolymer particles with an amine in the presence of at least 100 parts by weight, per 100 parts by weight of the copolymer, of water and at least 5 parts by weight, per 100 parts by weight of water, of a water-soluble inorganic salt.

3. The process according to claim 1, wherein the water-soluble inorganic salt is selected from the group consisting of alkali metal salts and alkaline earth metal salts.

4. The process according to claim 2, wherein the water-soluble inorganic salt is selected from the group consisting of alkali metal salts and alkaline earth metal salts.

5. The process according to claim 1, wherein the crosslinked haloalkyl-containing copolymer particles are reacted with the amine in the presence of at least 150 parts by weight of water per 100 parts by weight of the copolymer.

6. The process according to claim 2, wherein the crosslinked haloalkyl-containing copolymer particles are reacted with the amine in the presence of at least 150 parts by weight of water per 100 parts by weight of the copolymer.

7. The process according to claim 1, wherein the amine is reacted in the presence of 7 to 30 parts by weight of the water-soluble inorganic salt per 100 parts of water.

8. The process according to claim 2, wherein the amine is reacted in the presence of 7 to 30 parts by weight of the water-soluble inorganic salt per 100 parts of water.

9. The process according to claim 1, wherein the amine is reacted in the presence of at most 1 part by weight of an aliphatic lower alcohol per 100 parts by weight of water.

10. The process according to claim 2, wherein the amine is reacted in the presence of at most 1 part by weight of an aliphatic lower alcohol per 100 parts by weight of water.

11. The process according to claim 1, wherein the aromatic crosslinked haloalkyl-containing copolymer particles have a structure in which the haloalkyl group has been bonded to a copolymer of styrene and divinylbenzene.

12. The process according to claim 2, wherein the aromatic crosslinked haloalkyl-containing copolymer particles have a structure in which the haloalkyl group has been bonded to a copolymer of styrene and divinylbenzene.

* * * * *